(12) United States Patent
Hanada et al.

(10) Patent No.: US 6,967,813 B2
(45) Date of Patent: Nov. 22, 2005

(54) METHOD OF MOUNTING MAGNETIC DISK DEVICE, CABINET FOR MAGNETIC DISK DEVICE, AND MAGNETIC DISK DEVICE

(75) Inventors: Kazuyoshi Hanada, Odawara (JP); Shigeo Nakamura, Odawara (JP)

(73) Assignee: Hitachi Global Storage Technologies Japan, Ltd., Kanagawa (JP)

( * ) Notice: Subject to any disclaimer, the term of this patent is extended or adjusted under 35 U.S.C. 154(b) by 0 days.

(21) Appl. No.: 10/433,103

(22) PCT Filed: Dec. 3, 2001

(86) PCT No.: PCT/JP01/10540

§ 371 (c)(1),
(2), (4) Date: Oct. 22, 2003

(87) PCT Pub. No.: WO02/47088

PCT Pub. Date: Jun. 13, 2002

(65) Prior Publication Data

US 2004/0037001 A1 Feb. 26, 2004

(30) Foreign Application Priority Data

Dec. 4, 2000 (JP) ......................................... 2000-372924

(51) Int. Cl.[7] .............................................. G11B 5/012
(52) U.S. Cl. ................................................... 360/97.01
(58) Field of Search ........................... 360/97.01, 97.02; 361/685; 720/609

(56) References Cited

U.S. PATENT DOCUMENTS

| | | | | |
|---|---|---|---|---|
| 5,623,597 A | * | 4/1997 | Kikinis | ........................ 713/200 |
| 5,737,304 A | * | 4/1998 | Soga et al. | .................. 720/692 |
| 5,930,738 A | * | 7/1999 | Jones | .......................... 702/132 |
| 6,005,768 A | * | 12/1999 | Jo | ................................ 361/685 |
| 6,111,837 A | * | 8/2000 | Watanabe et al. | ............ 720/601 |
| 6,169,930 B1 | * | 1/2001 | Blachek et al. | ................ 700/79 |
| 6,434,000 B1 | * | 8/2002 | Pandolfi | ..................... 361/685 |
| 6,567,265 B1 | * | 5/2003 | Yamamura et al. | ......... 361/685 |
| 6,567,360 B1 | * | 5/2003 | Kagawa | ...................... 720/609 |
| 6,735,035 B1 | * | 5/2004 | Smith et al. | .................. 360/69 |

FOREIGN PATENT DOCUMENTS

| | | |
|---|---|---|
| JP | 2-053287 | 2/1990 |
| JP | 2-134789 | 5/1990 |
| JP | 3-54789 | 3/1991 |
| JP | 4-049590 | 2/1992 |
| JP | 3043708 | 9/1997 |
| JP | 10-167348 | 6/1998 |
| JP | 11-213644 | 8/1999 |

* cited by examiner

*Primary Examiner*—Tianjie Chen
(74) *Attorney, Agent, or Firm*—Mattingly, Stanger, Malur & Brundidge, P.C.

(57) ABSTRACT

The invention relates to the construction of an in-vehicle magnetic disk drive and a case for holding the in-vehicle magnetic disk drive. The in-vehicle magnetic disk drive must meet a condition peculiar thereto requiring normal operations under severe temperature conditions. An environment of an excessively low temperature disturbs a normal information recording operation, while an environment of an excessively high temperature makes the retention of recorded information impossible. The case is provided with a cold insulator, a heat insulator, a heat insulating material and a temperature sensor and is set in a specific position. The operation of the magnetic disk drive at temperatures outside a predetermined temperature range is inhibited.

5 Claims, 6 Drawing Sheets

METHOD OF MOUNTING MAGNETIC DISK
DEVICE, CABINET FOR MAGNETIC DISK
DEVICE, AND MAGNETIC DISK DEVICE

TECHNICAL FIELD

The present invention relates to an information recording/reproducing device and, more particularly, to the construction of a case for holding an information recording/reproducing device in an environment where temperature condition is severe on a magnetic disk, such as an environment in a vehicle.

BACKGROUND ART

Generally, a magnetic disk drive is held in a case provided with a cooling fan as mentioned in Japanese Patent Laid-open No. 4-49590. Usually, the case is placed in a completely air-conditioned room.

Recent vehicles are equipped with a navigation system and other electronic systems. Those in-vehicle systems exchange information with external systems through a satellite, and mails can be sent out and received at optional places by mobile telephones. Thus, the amount of information with which in-vehicle systems need to deal has progressively been increased. To meet such a trend, an information recording/reproducing device for recording and reproducing information including still pictures, animations and music numbers, particularly, a magnetic disk drive is necessary. A magnetic disk drive enables, for example, a navigation system to achieve quick response and information update. A magnetic disk drive is capable of downloading (storing) a large amount of information through a private telecommunication network using ground waves and satellites or the Internet Usually, the operating environment of a magnetic disk drive was in a room, and the magnetic disk drive was held in a case provided with a cooling fan. It has been a technical subject relating with the temperature of the environment in which the magnetic disk drive operates to control the temperature of a heat source to limit the upper limit of temperature in the magnetic disk drive to, for example, about 50° C.

The temperature of the interior of a vehicle exceeds, sometimes, several tens degrees Celsius when the vehicle is parked under a burning sun in summer and drops, sometimes, below −20° C. when in the morning in winter. A magnetic disk drive mounted on a vehicle is exposed to such a severe thermal environment. In a low-temperature environment, the rotation of magnetic domains and the displacement of magnetic domain walls in a magnetic disk are difficult and the magnetic disk drive is unable to write information to the magnetic disk. In a high-temperature environment, the rotation of magnetic domains and the displacement of magnetic domain walls in a magnetic disk occur easily. Consequently, written information cannot be held in the magnetic disk; that is, the magnetic disk is unable to keep storing information. An in-vehicle magnetic disk drive is required to operate normally under vibrations.

DISCLOSURE OF INVENTION

A magnetic disk drive according to the present invention is provided with a mechanism or parts facilitating placing the magnetic disk drive in and removing the same from a case to enable mounting the magnetic disk drive on a vehicle only when necessary. The magnetic disk drive can permanently fixedly be mounted on a vehicle.

The ambient temperature, i.e., the temperature of a space surrounding the magnetic disk drive, is measured by a temperature sensor placed in the case holding the magnetic disk drive, and the magnetic disk drive has a function to withhold its operation unless the ambient temperature is within a temperature range suitable for the operation of the magnetic disk drive. The function to withhold operation is a function to inhibit the connection of the magnetic disk drive to a power supply, a function to generate a warning sound, a function to display warning light, a function to display a message to that effect, a function to generate a warning voice or such. Thus, the safe operation of the magnetic disk drive can be ensured even if the magnetic disk drive is left in the vehicle or the user forget to remove the magnetic disk drive from the vehicle. The temperature sensor may be placed inside the magnetic disk drive.

The magnetic disk drive is disposed near an air outlet, through which hot or cold air is blown out, of an air conditioning system to make the temperature of the magnetic disk drive reach the ambient temperature quickly. A cold insulator or a heat insulator is disposed in the vicinity of the magnetic disk drive for cases where the magnetic disk drive is left in the vehicle. More specifically, a cold insulator or a heat insulator is placed in the case holding the magnetic disk drive, and the case is covered with a heat insulating material.

A heat source may be disposed inside the magnetic disk drive or near the magnetic disk drive. The heat source is, for example, a plate-shaped heater, a heater formed by arranging a linear heating element on a plate-shaped member having a high heat conductivity, such as a ceramic plate or a metal plate, or a flexible heater formed by arranging a resistance wire on a flexible printed circuit sheet (FPC sheet)

The temperature of the space surrounding the magnetic disk drive drops and rises in a certain temperature range. A rotating shaft included in a spindle motor for rotating the magnetic disk, a rotating shaft included in a carriage for carrying a magnetic head, and a base fixedly holding component parts may be formed of ceramic materials to prevent the misalignment of the magnetic disk and the magnetic head due to thermal expansion.

The magnetic disk drive is fixedly held in a vehicle such that the moving directions of the carriage of the magnetic disk drive coincide with vertical directions, and the surfaces of the magnetic disk are parallel to a lateral direction, in which less shocks act, with respect to the moving direction of the vehicle to prevent the adverse effect of vibrations and shocks characteristic of the vehicle and to prevent collision between the magnetic disk and the magnetic head. The phrase "the moving directions of the carriage of the magnetic disk drive coincide with vertical directions" signifies that the moving directions of the carriage are substantially parallel to directions in which shocks act.

BEST MODE FOR CARRYING OUT THE INVENTION

A preferred embodiment of the present invention will be described with reference to FIGS. 1 to 5.

Figure 5:
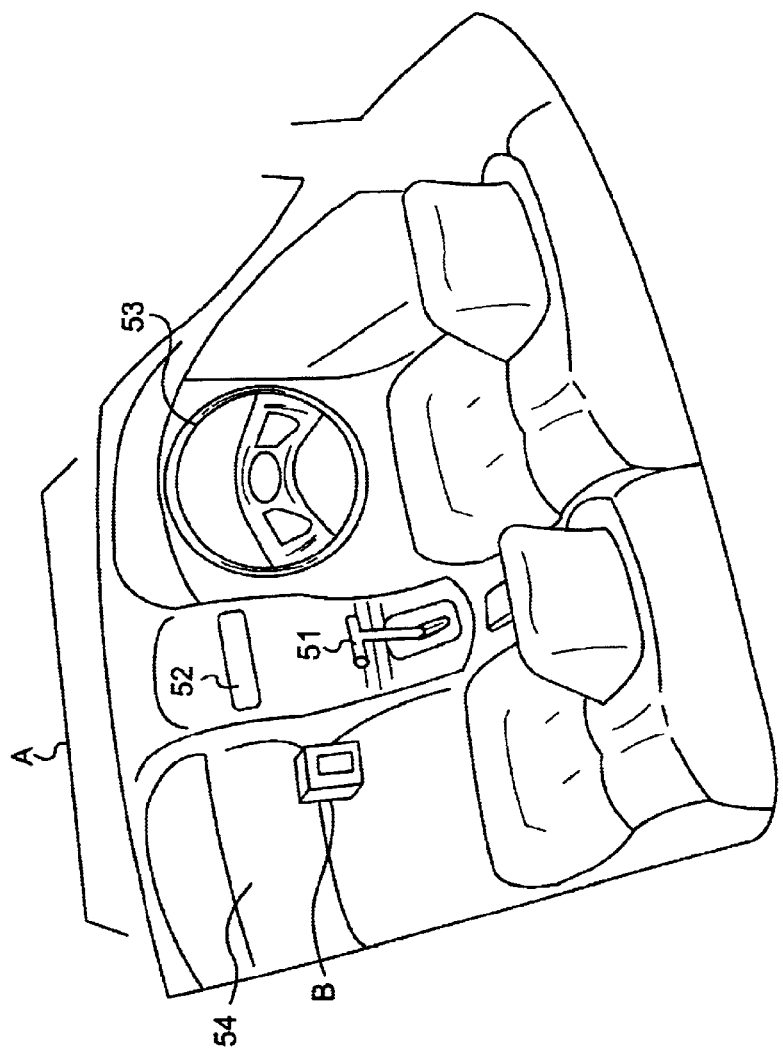
FIG. 5 is a schematic view of the driver's seat and the passenger seat of a vehicle taken obliquely from behind.

FIG. 5 is a schematic view of the driver's seat and the passenger seat of a vehicle taken obliquely from behind. A console A has a central console box provided with a gearshift lever 51 and built-in devices 52 including automotive audio devices. A steering wheel 53 is disposed behind a right part of the console A, and an automotive air conditioner, not shown, is disposed in a space 54 in a left part of the console A. The built-in devices include a personal computer and portable electronic devices.

An in-vehicle magnetic disk drive holding case is disposed in a space B. The in-vehicle magnetic disk drive holding case is a case for holding a magnetic disk drive. Warm air or cool air blown by the automotive air conditioner flows around the case.

Although the in-vehicle case is shown typically to facilitate recognizing the position of the in-vehicle case, ignoring design in FIG. 5, actually, the in-vehicle case is designed integrally with the console A so that part of the passage of air blown by the air conditioner penetrates the in-vehicle case.

If the in-vehicle case does not need to be cooled, i.e., if the magnetic disk drive does not need to be cooled, the in-vehicle case may be disposed inside the console A irrespective of the passage of air blown by the air conditioner. In such a case, the recording medium of the magnetic disk to be driven by the magnetic disk drive must be formed of a material having high coercive force and resistant to the effect of high temperatures that causes magnetic domain rotation and magnetic domain wall displacement.

Figure 1:
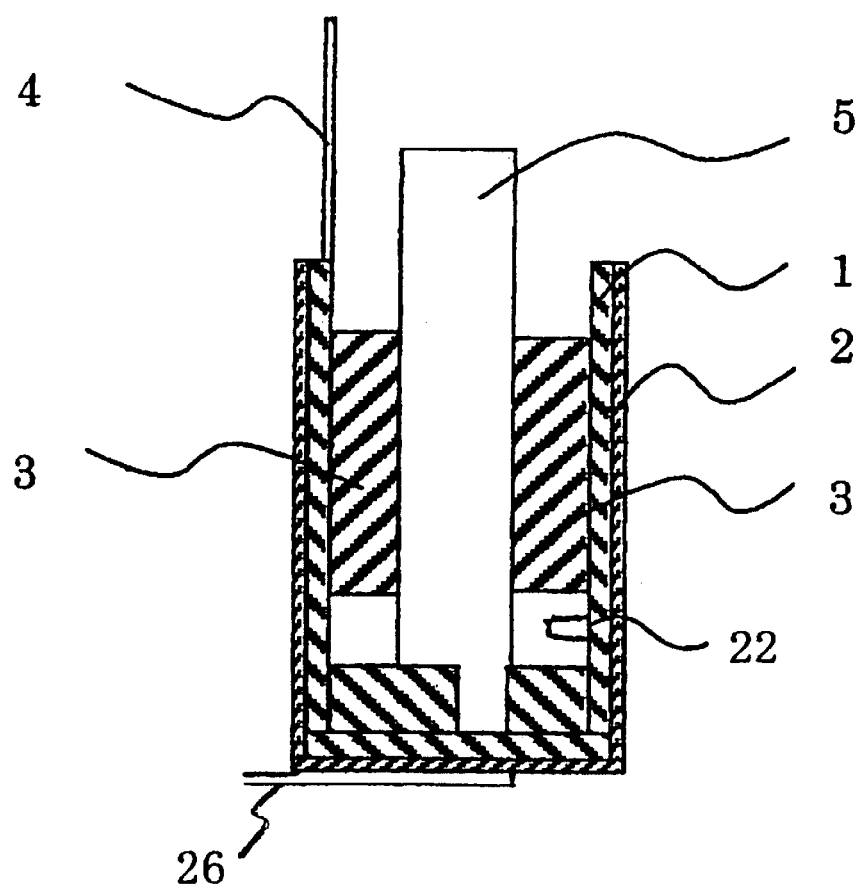
FIG. 1 is a sectional view of a preferred embodiment of the present invention showing a magnetic disk drive 5 held in a case.

FIG. 1 is a sectional side elevation of the magnetic disk drive 5 and the in-vehicle case 1 holding the magnetic disk drive 5.

The in-vehicle case 1 holding the magnetic disk drive 5 has a case body formed of a plastic material, and a heat-insulating layer 2 of aluminum coating the outer surface of the case body to avoid exposing the case body to direct sunlight and to keep the internal temperature of the in-vehicle case constant. The aluminum heat-insulating layer 2 is bonded to the plastic case body. The plastic case body may be coated with such a coating by any other suitable process, such as an electrodeposition coating process or a plating process.

The positional relation between the air vent of the air conditioner and an opening formed in the in-vehicle case 1 is determined such that warm air or cool air blown out by the air conditioner is able to flow efficiently into the case 1. More specifically, a lid 4 may serve as a guide plate for guiding air blown by the air conditioner. Air is able to flow efficiently through the case 1 when the case 1 is provided with another opening.

A cold/heat insulator 3 is placed in the case 1 to keep the magnetic disk drive 5 at temperatures near the internal temperature of the compartment of the vehicle. When a cold/heat insulating gel is used as the cold/heat insulator 3, the cold/heat insulator 3 is function as a shock-absorbing material for holding the magnetic disk drive 5. The cold/heat insulator 3 is bonded adhesively to the in-vehicle case 1. Alternatively, the cold/heat insulator 3 may fixedly be held in the case 1 by holding projections formed on the case 1. When a cold/heat insulating gel is used as the cold/heat insulator 3, the cold/heat insulator is held in close contact with the magnetic disk drive 5.

The magnetic disk drive 5 is held in the in-vehicle case 1 by the mechanical retaining force of its own connector. The case 1 may be closed by the lid 4 to hold the magnetic disk drive 5 with reliability. If the lid 4 is used as a guide plate for guiding air blown by the air conditioner, an opening, i.e., a vent, is formed in a wall, not facing the console, of the case 1 so that the aesthetic appearance of the console may not be spoiled. If the lid 4 is not closed, the magnetic disk drive 5 is fixed firmly with a holding member or a locking mechanism, not shown.

When the magnetic disk drive 5 is inserted in and fixedly held in the in-vehicle case 1, i.e., when the magnetic disk drive 5 is held by the in-vehicle case 1, the magnetic disk drive 5 is connected for information transmission to in-vehicle electronic devices and is connected to a power supply. If the user does not mind connecting the magnetic disk drive 5 to the power supply, the magnetic disk drive 5 may be connected to the power supply by an additional operation.

A temperature sensor 22 is placed inside the invehicle case 1. The temperature sensor 22 is connected electrically to an electronic device by a cable 26. The electronic device performs a predetermined process on the basis of an electric signal provided by the temperature sensor 22 and, if a temperature measured by the temperature sensor 22 is above the upper limit or below the lower limit of a temperature range determined for the normal operation of the magnetic disk drive 5, gives notice to the effect that the magnetic disk drive 5 is unable to operate. The notice may be given through an electronic device placed on the console, may be displayed by sending a signal to an LED, a liquid crystal display or other display devices, or may be given by an electronic audio device placed on the console. Practical means for giving the notice is, for example, automatic inhibition of connection of the magnetic disk drive 5 to the power supply, generation of a warning sound, lighting of a red LED or generation of a voice message to the effect that the temperature is not in the operating temperature range.

Figure 2:
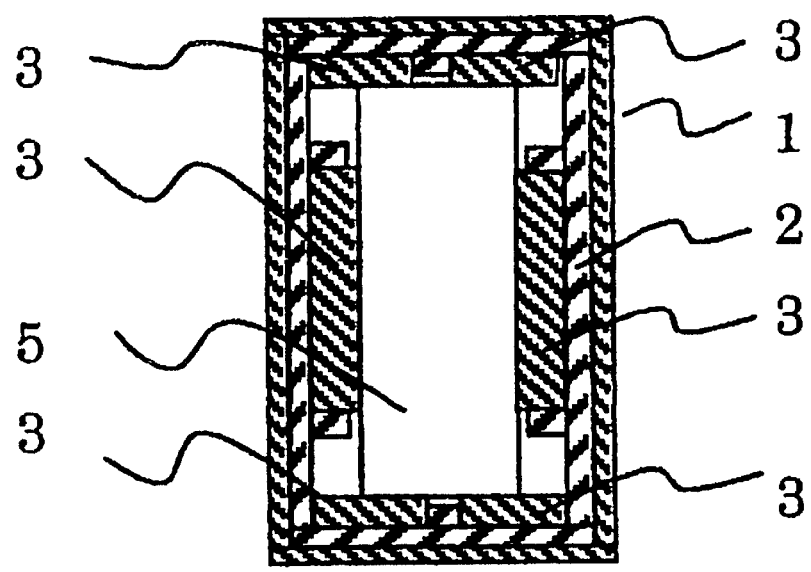
FIG. 2 is a sectional plan view of the embodiment shown in FIG. 1.

FIG. 2 is a sectional plan view of the in-vehicle case 1 and the magnetic disk drive 5 contained in the in-vehicle case 1. The in-vehicle case 1, as explained with reference to FIG. 5, may individually be disposed in the vehicle or may be used as a docking bay for a host electronic device, such as another personal computer, a video device or a DVD device. The cold/heat insulator 3 surrounds the magnetic disk drive. The case 1 may be provided with a plate-shaped heater or the like instead of the aluminum heat-insulating layer 2.

A plate-shaped heater 2' is placed between the in-vehicle case 1 and the magnetic disk drive 5 inserted in the in-vehicle case 1. Power is supplied from an external power supply to the plate-shaped heater 2' to heat the magnetic disk drive 5 so that the temperature of the magnetic disk drive 5 may not drop below a predetermined temperature. When the case 1 is designed so as to meet cold-weather specifications, power is supplied to the plate-shaped heater from the battery of the vehicle, a power supply installed in a parking place or some other external power supplies.

The basic configuration of the magnetic disk drive 5 will be described with reference to FIG. 3. Disks 19 each formed by forming a magnetic film on an aluminum or glass substrate are capable of magnetically holding information. A spindle motor rotates the disks 19. The spindle motor includes a hub 12 supporting the magnetic disks 19 in layers, a disk clamp 6 for fastening the disks 19 to the hub 12, and a motor shaft 17 held on a base 18 and supporting the hub 12 for ration by bearings.

Each of magnetic heads 7 floats above a surface of the disk 19 with a fixed very small clearance of several tens nanometers to write information magnetically to and to read information magnetically from the disk 19. The magnetic head 7 is provided with an electromagnetic coil capable of electromagnetically providing electric signals respectively corresponding to magnetic fields created by magnetic domains in the disk 19. The magnetic head 7 is formed on a ferrite base of a laminated structure of metal thin films.

A carriage 13 for correctly positioning the magnetic head 7 relative to the surface of the disk 19 is formed of a metal containing aluminum or magnesium as a principal component. The carriage 13 is driven for positioning by a voice-coil motor 9 including a coil 10 formed by coiling an insulated aluminum or copper wire, a permanent magnet, and a yoke holding the coil 10 and the permanent magnet to form a magnetic circuit. The carriage 13, similarly to the spindle motor, is supported for turning by bearings on a carriage shaft 8 set on the base 18.

Figure 4:
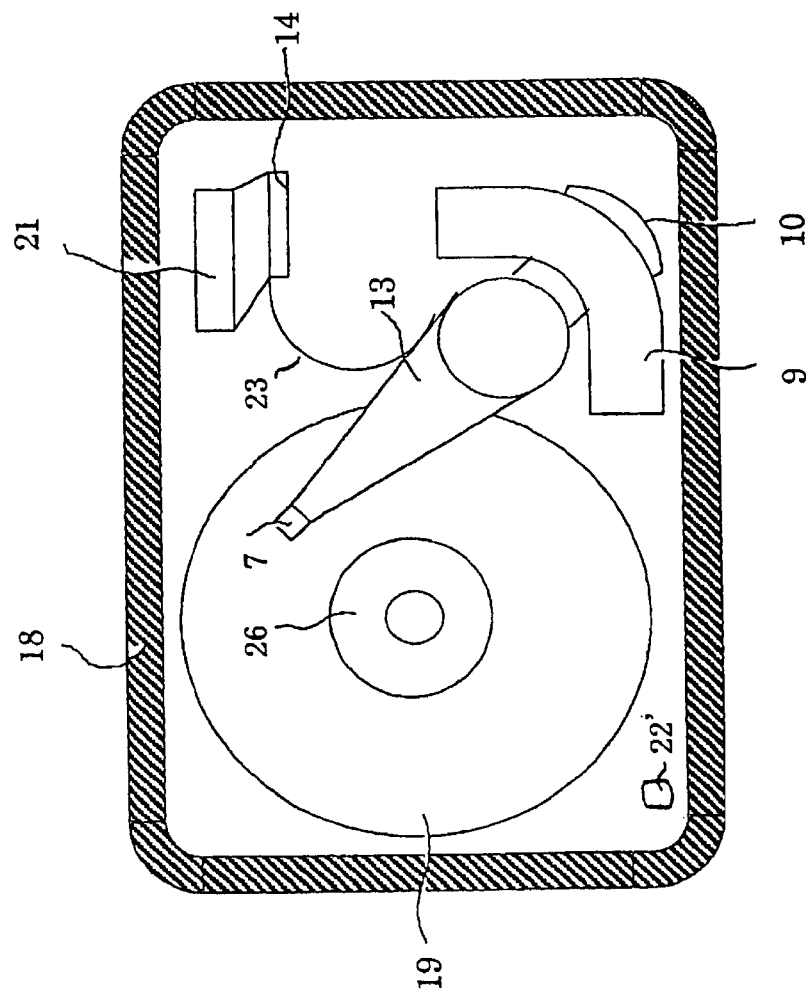
FIG. 4 is a plan view of a magnetic disk drive, in which a cover 15 is removed.

Referring to FIG. 4, electric signals are transmitted for reading and writing from the magnetic head 7 through the fine wire of the electromagnetic coil of the magnetic head 7 extended through the carriage 13 to a flexible printed circuit board (FPC board) 23. The electric signal is transmitted from an HDA through a read/write control board 14 for controlling the read and write signal of the magnetic head 7 and through an enclosed connector 21 underlying the read/write control board 14 to an external device. The enclosed connector 21 has a body formed of aluminum, a stainless steel or iron and is fixedly bonded adhesively to the base 18.

The HDA, i.e., the hard disk assembly, is a component, surrounded by the base 18 and a cover 15, of the magnetic disk drive.

A temperature sensor 22' may be placed inside the HAD. Signals provided by the temperature sensor 22' are transmitted through the connector 21 to an external device. An electronic device, i.e., a host device, is capable of controlling the interior temperature of the HDA and the temperature of an atmosphere surrounding the disks 19 with higher accuracy.

The enclosed connector 21, through which the HDA exchanges electric signals with external devices, has a plurality of pins, and a pin holder formed by molding. The pins and the pin holder are perfectly enclosed. A coil drive current for driving the coil 10 is transmitted through the FPC 23 to the enclosed connector 21. A motor FPC connected to the spindle motor transmits a spindle motor drive current to the enclosed connector 21. All the signal lines connecting the HDA to the external devices do not need necessarily to be connected through the enclosed connector 21 to the external devices. For example, driving power for driving the spindle motor may be supplied through separate wiring into the HDA.

The enclosed connector 21 is connected to a main board 11 (FIG. 3) for controlling external devices provided outside the HDA. The shafts of the spindle motor and the carriage 13, and the voice-coil motor 9 are fastened to the base 18 with screws. The cover 15 of aluminum, stainless steel or iron is fastened to the base 18, the spindle motor, the shaft of the carriage 13 and the voice-coil motor 9 with screws with a packing, not shown, held for sealing between the cover 15 and the base 18. The main board 11 is fastened to the base 18 with screws 16.

Existence of any foreign matter that obstructs a magnetic path in the space between the magnetic head 7 and the disk should be avoided to process signals accurately when the magnetic head 7 writes or reads information to or from the disk 19. Therefore, the space must always be kept clean. The HDA is provided with an internal filter, not shown, to catch dust contained in circulating air currents produced in the HDA by the rotating disks 19.

The magnetic disk drive is provided with the plurality of disks 19 to have a necessary storage capacity, and the magnetic heads 7 are disposed opposite to the surfaces of the disks 19, respectively. A disk spacer 20 is placed between the adjacent disks 19. and the magnetic heads 7 are disposed at predetermined intervals by accurately finishing mounting surfaces, on which the magnetic heads 7 are mounted, of the carriage 13.

It is possible that the magnetic heads 7 collide with the disks 19 when a shock is given to the magnetic disk drive 5. The magnetic disk drive 5 held on the vehicle such that the moving directions, i.e., seek directions, of the carriage 13 are vertical to reduce the effect, that cause the magnetic heads 7 to collide with the disks 19, of shocks mostly acting in vertical directions and peculiar to the vehicle. The magnetic disk drive 5 is disposed with a line perpendicular to the surfaces of the disks 19 extended in the moving direction of the vehicle, in which less shocks act (excluding collision and special conditions), or laterally with respect to the moving direction of the vehicle. A vibration isolating material may be disposed in the vicinity of the cold insulator 3 to enhance the vibration proof.

Figure 3:
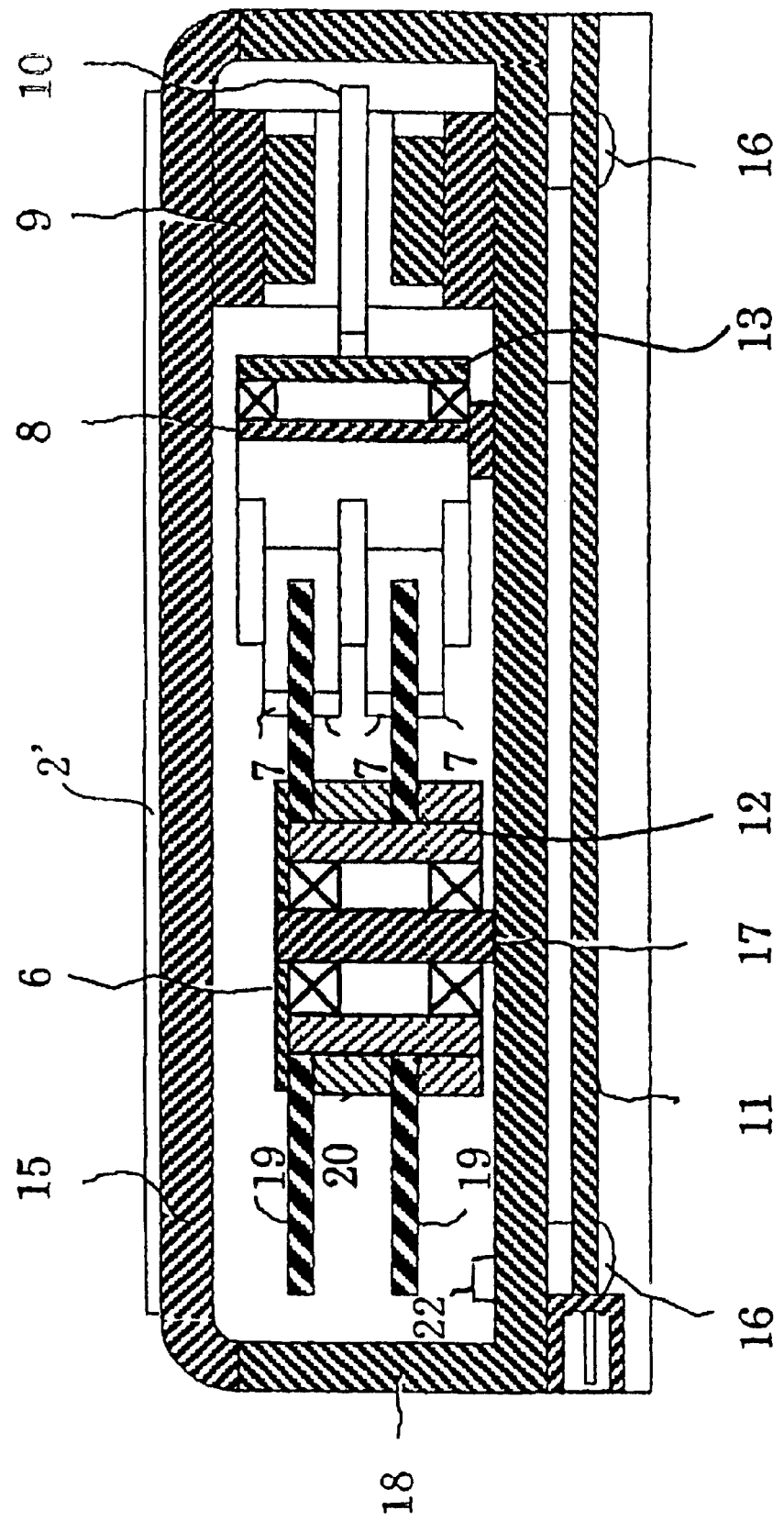
FIG. 3 is a sectional view of a magnetic disk drive.

In the embodiment shown in FIG. 3, the heater 2' is applied to the cover 15. The heater 2' may be applied to the main board 11. The base 18, the cover 15 and the main board 11 may be packed in an outer package. The outer package may cover only a part of the magnetic disk drive. The outer package is a decorative case of a predetermined design facilitating carrying the magnetic disk drive 5. When necessary, the heater 2' may be interposed between the outer package and the magnetic disk drive 5.

Figure 6:
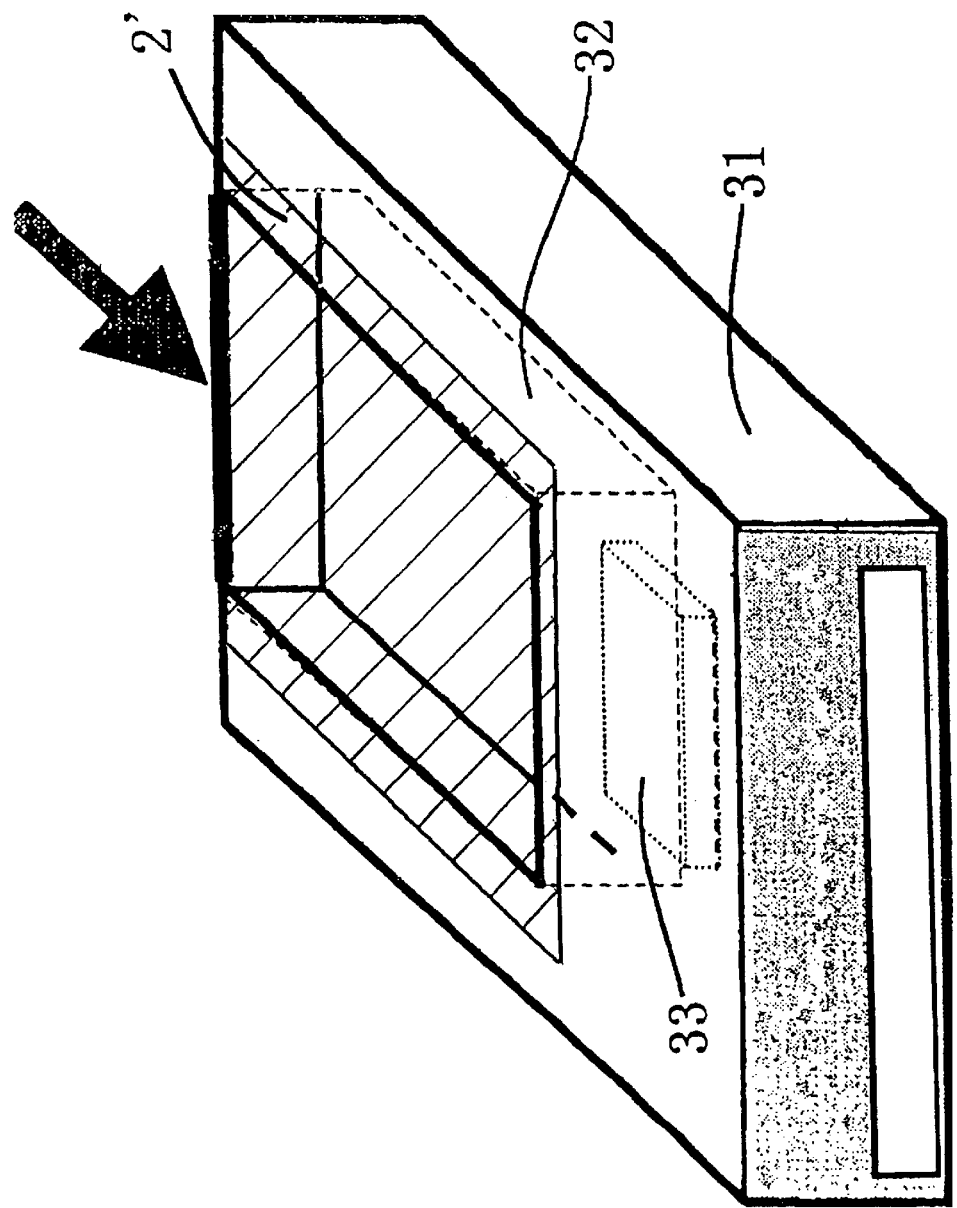
FIG. 6 is a schematic perspective view of a host apparatus 31 provided with a holding chamber 32 for accommodating the magnetic disk drive therein, in which a direction in which the magnetic disk drive 5 is loaded into the host apparatus 31 is indicated by the arrow.

FIG. 6 shows a host device 31 provided with a chamber 32 for fitly holding the magnetic disk drive 5 therein. In FIG. 6, the arrow indicates a direction in which the magnetic disk drive 5 is inserted in the chamber 32. The plate-shaped heater 2' is placed between the host device 31 and the magnetic disk drive 5. A connector 33 connects the magnetic disk drive 5 electrically to external devices and has a mechanical ability to hold the magnetic disk drive 5 in place. The host device 31 manipulates information recorded in the magnetic disk drive 5 for predetermined information processing and records the results of information manipulation in the magnetic disk drive 5.

When the temperature of the magnetic disk drive 5 is not in the temperature range for the normal operation of the magnetic disk drive 5, the magnetic disk drive 5 gives information to that effect to the host device 3. The host device 31 measures the temperature and holds an inoperative mode for not processing information and provides a signal to that effect. The signal representing the inoperative mode may be a voice signal, an image signal to be displayed by a display or a warning expressed by lighting an LED.

When the magnetic disk drive 5 can easily be put in and taken out of the case, it is convenient for carrying and storing the magnetic disk drive 5 to pack the magnetic disk drive 5 taken out of the in-vehicle case 1 or the case of the host device 31, i.e., an electronic device, in an outer package capable of entirely covering the magnetic disk drive 5. The magnetic disk drive 5 is packed in a package formed by molding a plastic material or the like and capable of covering the cover 15 and the base 18 of the magnetic disk drive 5 shown in FIG. 3.

The magnetic disk drive 5 packed in the outer package may be inserted in the in-vehicle case 1. In addition, the magnetic disk drive 5 with the outer package may be taken out of the case if necessary and carried around to protect the magnetic disk drive 5 from a severe environment.

If the magnetic disk drive 5 is not removed from the case and is installed permanently in the vehicle, the plate-shaped heater is interposed between the cover 15 or the base 18 (FIG. 3) and the outer package, which improves thermal efficiency and hence the magnetic disk drive 5 can be kept at a proper temperature by less power.

The accuracy of monitoring the heating performance of the heater can easily be improved and the internal temperature of the magnetic disk drive 5 can easily be kept at a fixed level by placing a temperature sensor inside the magnetic disk drive 5.

As apparent from the foregoing description, the present invention provides the magnetic disk drive and a case capable of holding the magnetic disk drive in the vehicle.

What is claimed is:

1. A magnetic disk drive holding method of mounting a magnetic disk drive contained in a case and including rotating magnetic disks, magnetic heads for writing or reading information to or from the magnetic disks, and a carriage for moving the magnetic heads on the magnetic disks on a vehicle, said method comprising the steps of:

holding the magnetic disk drive such that the moving directions of the carriage of the magnetic disk drive coincide with a vertical direction relative to the vehicle;

holding the magnetic disks such that the surfaces of the magnetic disks are parallel to a lateral direction relative to the vehicle, forming an opening in the case; and disposing the case near an air vent of an air conditioner included in the vehicle.

2. The magnetic disk drive holding method according to claim 1, wherein the case is provided with a cold insulator for keeping the magnetic disk drive cool or a heat insulator for keeping the magnetic disk drive warm.

3. The magnetic disk drive holding method according to claim 1, wherein a heater is provided between the disk drive and the case.

4. The magnetic disk drive holding method according to claim 1, further comprising the steps of:

providing a temperature sensor for measuring the temperature inside the case, providing a cable for connecting the temperature sensor electrically to an electronic device which performs a predetermined process on the basis of an electric signal provided by the temperature sensor, sending a notice from said electronic device to said magnetic disk drive if a temperature measured by the temperature sensor is above the upper limit or below the lower limit of a temperature range determined by the normal operation of the magnetic disk drive and, inhibiting connection to a power supply or issuing a warning on the basis of the notice.

5. The magnetic disk drive holding method according to claim 2, wherein the cold insulator or the heat insulator serves also as a shock absorber.

* * * * *